(12) United States Patent
Komiya

(10) Patent No.: US 7,710,088 B2
(45) Date of Patent: May 4, 2010

(54) SWITCHING REGULATOR WITH AN ADJUSTABLE OUTPUT REGULATOR CIRCUIT AND A CONSTANT OUTPUT REGULATOR CIRCUIT

(75) Inventor: Motoki Komiya, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 351 days.

(21) Appl. No.: 11/878,068

(22) Filed: Jul. 20, 2007

(65) Prior Publication Data

US 2008/0024103 A1  Jan. 31, 2008

(30) Foreign Application Priority Data

Jul. 27, 2006  (JP) .............................. 2006-205220

(51) Int. Cl.
*G05F 1/59* (2006.01)

(52) U.S. Cl. ....................................................... 323/272

(58) Field of Classification Search ................. 323/222, 323/272, 282, 283, 284
See application file for complete search history.

(56) References Cited

U.S. PATENT DOCUMENTS

| 6,292,378 | B1* | 9/2001 | Brooks et al. ................. 363/65 |
| 2002/0135338 | A1* | 9/2002 | Hobrecht et al. ............ 323/272 |
| 2008/0197825 | A1* | 8/2008 | Siri ............................. 323/272 |
| 2009/0140706 | A1* | 6/2009 | Taufik et al. ................. 323/272 |
| 2009/0278517 | A1* | 11/2009 | Kleveland ................... 323/272 |

FOREIGN PATENT DOCUMENTS

| JP | A 4-210776 | 7/1992 |
| JP | A 8-84465 | 3/1996 |
| JP | A 2005-528067 | 9/2005 |
| JP | A 2005-533471 | 11/2005 |
| JP | A 2006-187140 | 7/2006 |
| WO | WO 03/063327 A2 | 7/2003 |
| WO | WO 2004/006037 A2 | 1/2004 |

* cited by examiner

*Primary Examiner*—Jeffrey L Sterrett
(74) *Attorney, Agent, or Firm*—Oliff & Berridge, PLC

(57) ABSTRACT

The switching regulator has a first switching regulator circuit for outputting a variable power according to a pulse width modulation pulse to be supplied; a second switching regulator circuit for outputting or stopping a constant power according to a control signal to be supplied; and a control circuit for controlling the first switching regulator circuit and the second switching regulator circuits. The control circuit increases the variable power of the first switching regulator circuit by an amount greater than a regular amount if a detected voltage changes from a status higher than the target voltage to a status lower than the target voltage, and decreases the variable power of the first switching regulator circuit by an amount greater than the regular amount if the detected voltage changes from a status lower than the target voltage to a status higher than the target voltage.

6 Claims, 13 Drawing Sheets

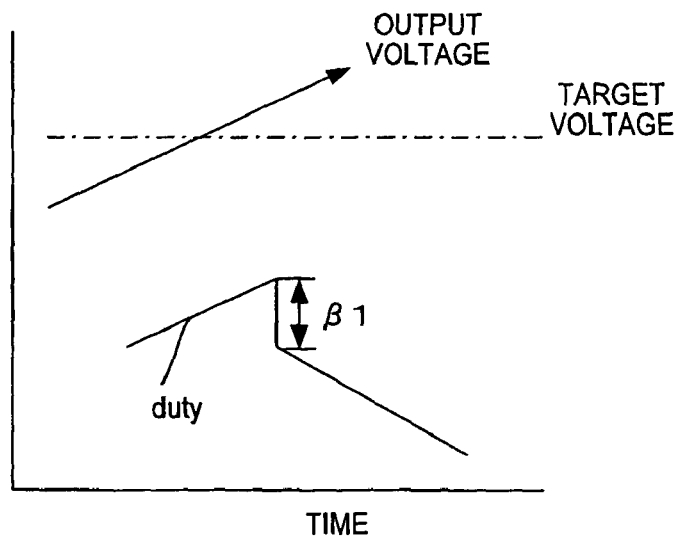
FIG.9 HARD SWITCHING REGULATOR OUTPUT CONTROL TARGET
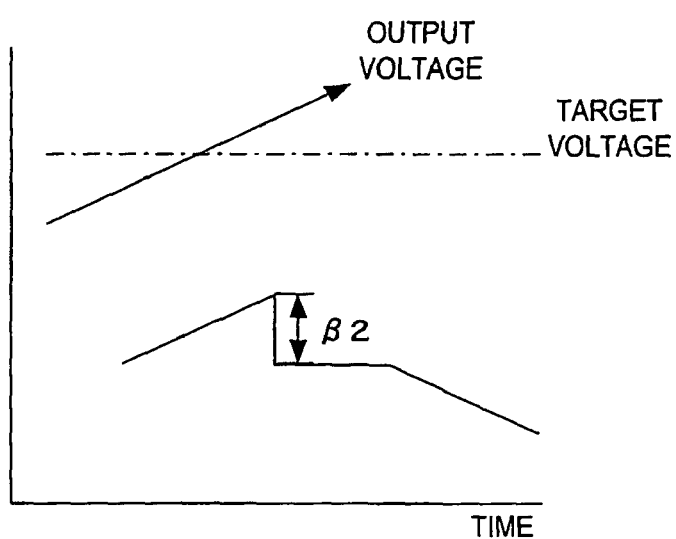
FIG.10 HARD SWITCHING REGULATOR OUTPUT CONTROL TARGET
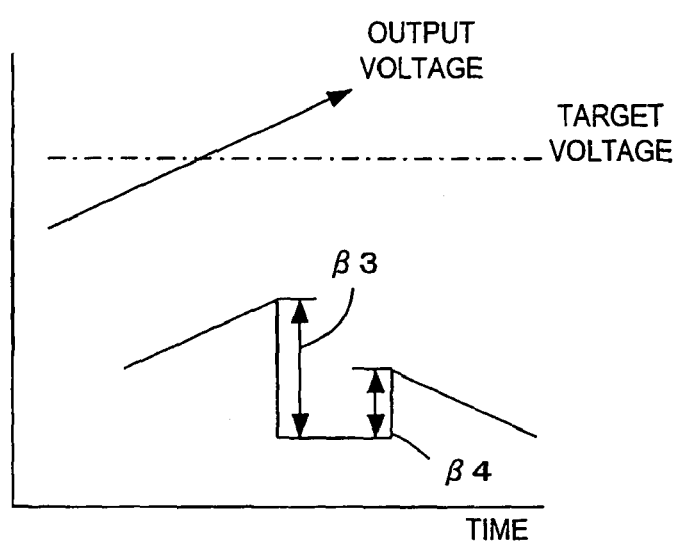
FIG.11 HARD SWITCHING REGULATOR OUTPUT CONTROL TARGET

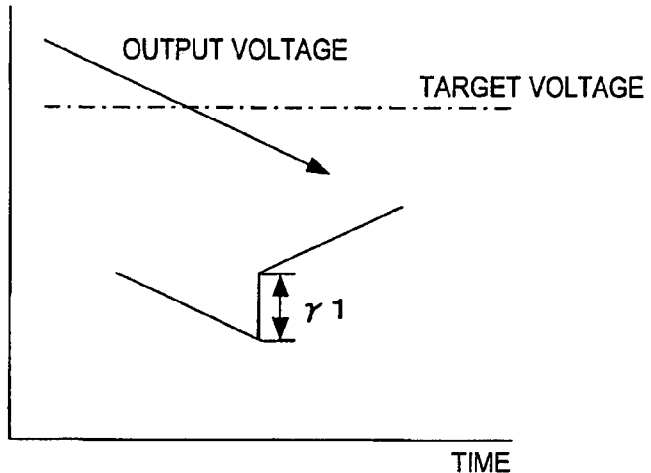
FIG.12 HARD SWITCHING REGULATOR OUTPUT CONTROL TARGET
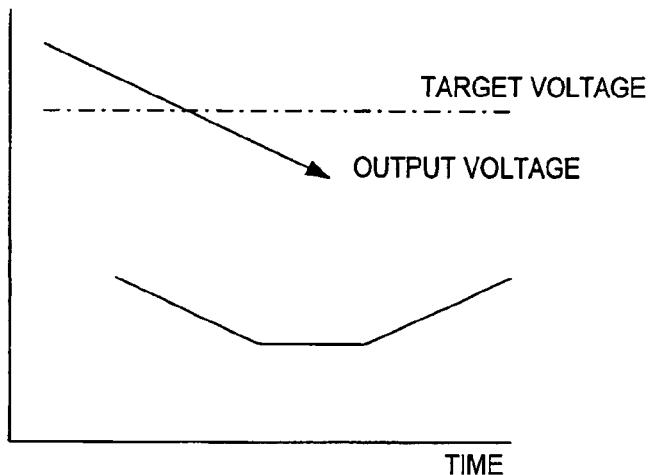
FIG.13 HARD SWITCHING REGULATOR OUTPUT CONTROL TARGET
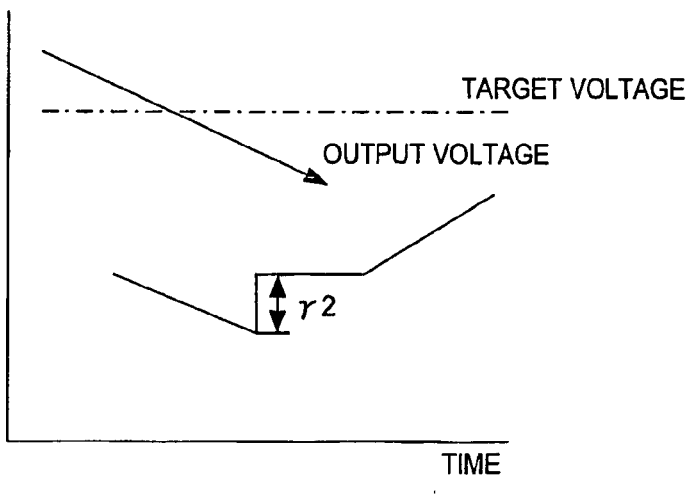
FIG.14 HARD SWITCHING REGULATOR OUTPUT CONTROL TARGET

SWITCHING REGULATOR WITH AN ADJUSTABLE OUTPUT REGULATOR CIRCUIT AND A CONSTANT OUTPUT REGULATOR CIRCUIT

CROSS-REFERENCE TO RELATED APPLICATIONS

This application is based upon and claims the benefit of priority from the prior Japanese Patent Application No. 2006-205220, filed on Jul. 27, 2006, the entire contents of which are incorporated herein by reference.

BACKGROUND OF THE INVENTION

1. Field of the Invention

The present invention relates to a multi-phase switching regulator, and more particularly to a switching regulator which performs control using a logic circuit.

2. Description of the Related Art

A switching regulator is used for many electronic devices. Generally a switching regulator converts input voltage into a predetermined voltage, and supplies it to circuits in the device.

FIG. 1A is a diagram depicting a configuration of a conventional switching regulator. FIG. 1B is a timing chart in the configuration in FIG. 1A. The conventional switching regulator comprises a differential amplifier 201, a reference voltage generation circuit 202, a comparator 203, a triangular wave generation circuit 204, a driver 205 and a transistor 206. The output voltage Vout of the conventional switching regulator is fed back to the differential amplifier 201. The reference voltage generated by the reference voltage generation circuit 202 is also input to the differential amplifier 201. The differential amplifier 201 compares the two inputs, and outputs an error voltage according to the comparison result.

FIG. 1B shows an error voltage VD by a dashed line. Along with the error voltage DV, a triangular wave TW, which is output from the triangular generation circuit 204, is input to the comparator 203. The comparator 203 compares the two inputs, and generates a PWM (Pulse Width Modulation) pulse.

Now the error voltage DV and the triangular wave TW in FIG. 1B will be described to assist in understanding the operation of the comparator 203. Here the time m0 to m7 is time when the error voltage DV and the triangular wave TW cross. In the period between time m0 and m1, the potential is lower in the error voltage DV than in the triangular wave TW. Therefore in the period between m0 and m1, the PWM pulse is at low level. In a period between time m1 and m2, the potential is higher in the error voltage DV than in the triangular wave TW. Therefore in the period between time m1 and m2, the PWM pulse is at high level. In the same manner, the high level and low level of the PWM pulse are switched at a time when the error voltage DV and triangular wave TW cross.

The generated PWM pulse is supplied to the driver 205, and the driver 205 supplies the signal RS, that is the inverted PWM pulse, to the gate of the transistor 206. The high level of the signal RS turns the transistor 206 ON. At this time, current It flows through the transistor 206. For example, the signal RS is at high level in the periods between time m4 and m5, and between time m6 and m7, and during these times the current It flows through the transistor 206, which is ON.

The current It is a current that flows from the input power supply Vin to the ground, and stores energy in the coil L which the current flow through. The amount of the stored energy is determined by the width of the PWM pulse. The energy stored in the coil L is supplied to an output terminal 207 as an output voltage at a timing when the driver 205 is not driving the transistor 206. The output power is supplied to an external circuit 208 via the output terminal 207. By adjusting this output power amount, the output voltage Vout in the output terminal 207 is maintained at a target voltage even if the load in the external circuit 208 fluctuates.

In such a switching regulator, if fluctuation of the load of the external circuit to which the output power is supplied is large, the adjustment width of the power to be supplied must be large as well. Therefore in this case, it is desirable to combine a plurality of switching regulators and supply the combined output power to the external circuit. Japanese Patent Application Laid-Open No. H4-210776 discloses a configuration using two switching regulators that are combined.

The switching regulator disclosed in Japanese Patent Application Laid-Open No. H4-210776 uses both a pulse width modulation type switching regulator and a resonance type switching regulator. In this switching regulator, only the pulse modulation type switching regulator operates in an area where the output power is low. At a point when the power to be output exceeds a predetermined value, the resonance type switching regulator is activated so as to increase the output power and maintain the target voltage.

SUMMARY OF THE INVENTION

If the fluctuation of the load of the external circuit becomes large, however, many switching regulators must be combined. In the case of using many switching regulators in combination, control become complicated and control could be performed using a logic circuit. If control is performed using a logic circuit, it is difficult to stabilize the output voltage at a value close to the target voltage, because of the limit of the detection cycle of the output voltage which is actually being output.

For example, if an output voltage is detected and is higher than the target voltage, the logic circuit for control performs control to drop the voltage. At this time, there is a time difference in the detection of the output voltage, performing control, and the next detection, so it is possible that the output voltage becomes lower than the target voltage at the point of performing the next detection after control completes. This operation causes instability in the output voltage to be supplied to the external circuit.

Also the output voltage becomes unstable when the number of channels to be operated is changed. For example, if the output voltage is much lower than the target voltage and the number of channels to be operated is increased, fluctuation of the output voltage increases by the dispersion of the operation of the new channels to be operated. In this case, the output voltage becomes much higher than the target voltage when control completes, and the control to decrease the number of channels to be operated is required again. This operation also causes instability in the output voltage to be supplied to the external circuit.

With the foregoing in view, it is an object of the present invention to provide a switching regulator that is controlled using a logic circuit, wherein the output voltage is stabilized at the target voltage.

To solve the above problem, the switching regulator of the present invention is a switching regulator constituted by a plurality of switching regulator circuits for inputting a predetermined common power supply voltage and supplying an output voltage to a common external circuit, so as to adjust the output voltage that is applied to the external circuit to be a target voltage, having: a first switching regulator circuit for outputting a variable power according to a pulse width modulation pulse to be supplied; a second switching regulator circuit for outputting or stopping a constant power according to a control signal to be supplied; an output decision circuit for detecting the output voltage to be applied to the external circuit; and a control circuit for adjusting the pulse width modulation pulse to be supplied to the first switching regulator circuit and the control signal to be supplied to the second switching regulator circuits according to a detected voltage supplied from the output decision circuit, so as to control the output voltage to be supplied to the external circuit, wherein the control circuit compares the detected voltage and the target voltage, decreases the variable power of the first switching regulator circuit by a predetermined amount if the detected voltage is higher than the target voltage, increases the variable power of the first switching regulator circuit by the predetermined amount if the detected voltage is lower than the target voltage, increases the variable power of the first switching regulator circuit by an amount greater than the predetermined amount if the detected voltage changes from a status higher than the target voltage to a status lower than the target voltage, and decreases the variable power of the first switching regulator circuit by an amount greater than the predetermined amount if the detected voltage changes from a status lower than the target voltage to a status higher than the target voltage.

According to a preferred embodiment, if the variable power of the first switching regulator circuit reaches a lower limit value, the control circuit stops the second switching regulator circuit outputting the constant power, adjusts the pulse width modulation pulse to increases the variable power by the constant power, and if the variable power of the first switching regulator circuit reaches an upper limit value, the control circuit controls the second switching regulator circuit in stopped status to be the status of outputting the constant power, and decreases the variable power of the first switching regulator circuit by the constant power.

According to a further preferred embodiment, when the stopped status of the second switching regulator circuit is switched to the status of outputting the constant power, the control circuit performs control so as to alternately repeat the status of outputting the constant power and the stopped status at a cycle faster than a cycle of comparing the output voltage and the target voltage.

According to a further preferred embodiment, in the status when the second switching regulator circuit repeats the status of outputting the constant power and the stopped status, the control circuit decreases the variable power of the first switching regulator circuit by a predetermined amount when the second switching regulator circuit is in the status of outputting the constant power, and increases the variable power of the first switching regulator circuit by a predetermined amount when the second switching regulator circuit is in stopped status.

According to a further preferable embodiment, if the detected voltage changes from a status higher than the target voltage to a status lower than the target voltage, the variable power of the first switching regulator circuit is increased by an amount greater than the predetermined amount, and then the variable power is maintained at a constant level during a predetermined time, and if the detected voltage changes from a status lower than the target voltage to a status higher than the target voltage, the variable power of the first switching regulator circuit is decreased by an amount greater than the predetermined amount, and then the variable power is maintained at a constant level during a predetermined time.

Another switching regulator of the present invention is a switching regulator constituted by a plurality of switching regulator circuits for inputting a predetermined common power supply voltage, and supplying an output voltage to a common external circuit, so as to adjust the output voltage that is applied to the external circuit to be a target voltage, having: a first switching regulator circuit for outputting a variable power according to a pulse width modulation pulse to be supplied; a second switching regulator circuit for outputting or stopping a constant power according to a control signal to be supplied; an output decision circuit for detecting the output voltage to be applied to the external circuit; and a control circuit for adjusting the pulse width modulation pulse to be supplied to the first switching regulator circuit and the control signal to be supplied to the second switching regulator circuit according to a detected voltage supplied from the output decision circuit, so as to control the output voltage to be supplied to the external circuit, wherein the control circuit compares the detected voltage and the target voltage, decreases a variable power of the first switching regulator circuit by a predetermined amount if the detected voltage is higher than the target voltage, increases the variable power of the first switching regulator circuit by the predetermined amount if the detected voltage is lower than the target voltage, the variable power is maintained at a constant level during a predetermined time if the detected voltage changes from a status higher than the target voltage to a status lower than the target voltage, and the variable power is maintained at a constant level during a predetermined time if the detected voltage changes from a status lower than the target voltage to a status higher than the target voltage.

The switching regulator of the present invention can stabilize the output voltage at a target voltage by detecting a timing when the output voltage passes the target voltage, and controlling the output voltage according to the fluctuation tendency thereof.

BRIEF DESCRIPTION OF THE DRAWINGS

FIG. 9 is a diagram depicting an example of a specified processing performed in step S7;

FIG. 10 is a diagram depicting an example of a specified processing performed in step S7;

FIG. 11 is a diagram depicting an example of a specified processing performed in step S7;

FIG. 12 is a diagram depicting an example of a specified processing performed in step S8;

FIG. 13 is a diagram depicting an example of a specified processing performed in step S8;

FIG. 14 is a diagram depicting an example of a specified processing performed in step S8;

DESCRIPTION OF THE PREFERRED EMBODIMENTS

Embodiments of the present invention will now be described with reference to the drawings. The technical scope of the present invention, however, is not limited to these embodiments, and covers the matters stated in the Claims and equivalents thereof.

Figure 1A:
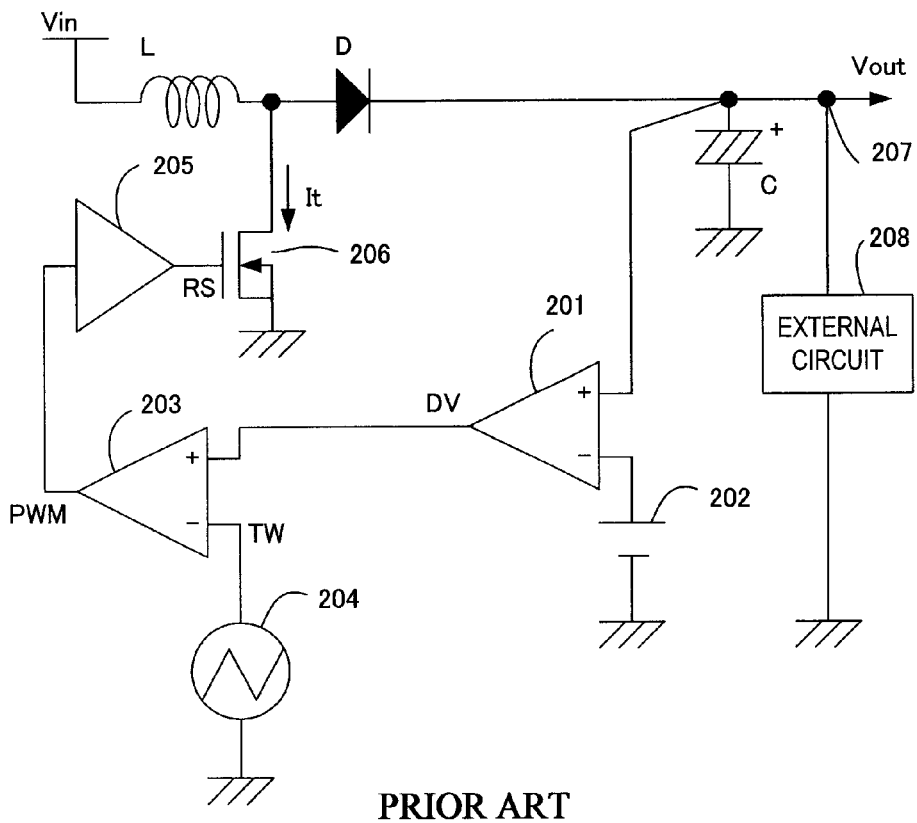
FIG. 1A is a diagram depicting a configuration of a conventional switching regulator.
Figure 1B:
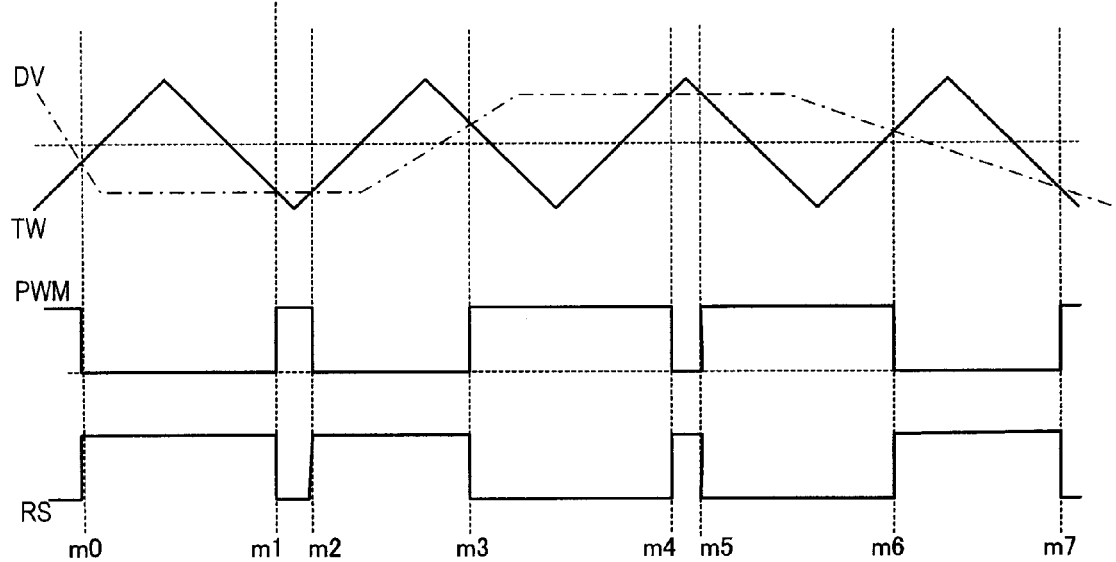
FIG. 1B is a timing chart thereof.
Figure 2:
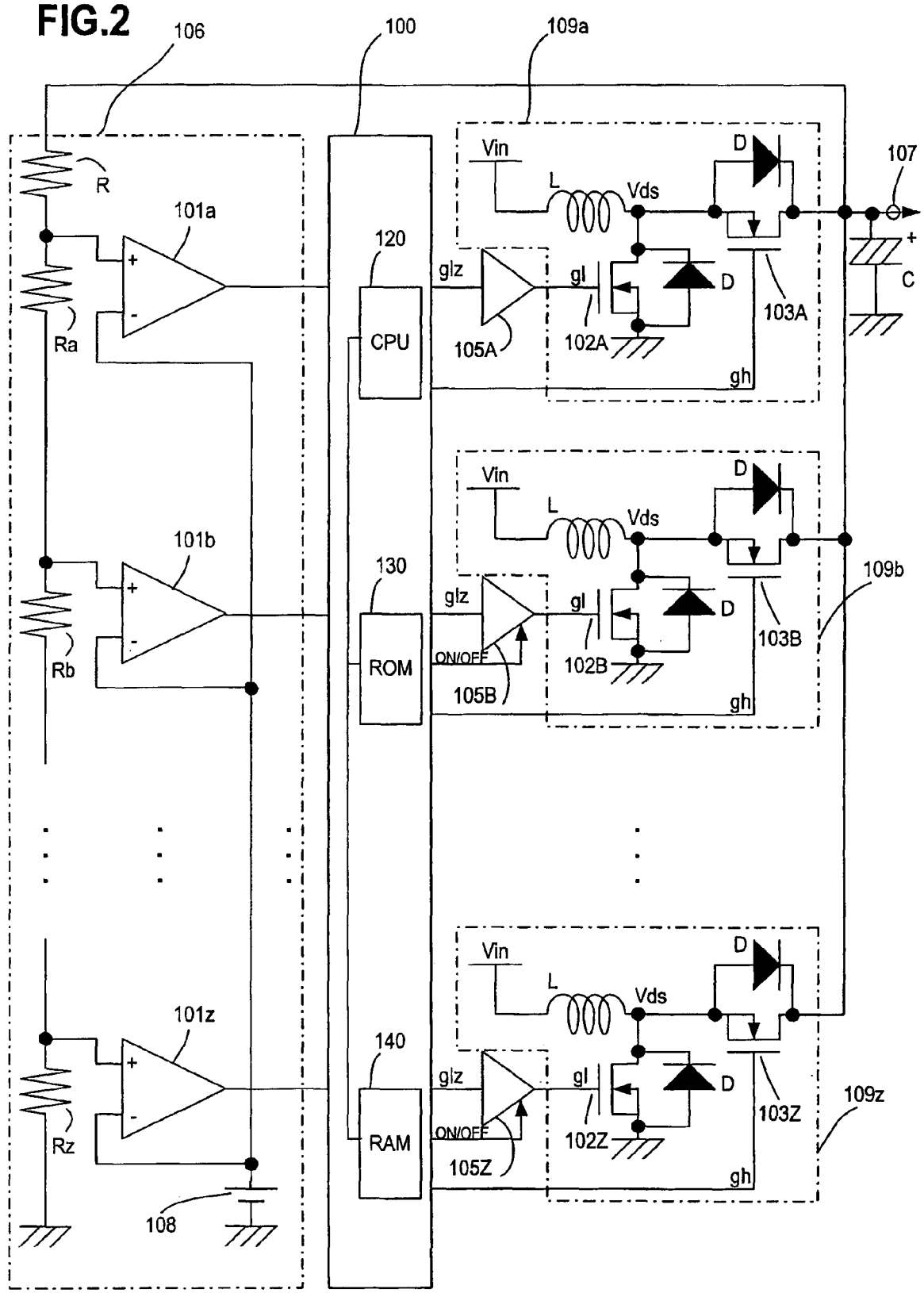
FIG. 2 is a diagram depicting a configuration of a switching regulator of the present invention.

FIG. 2 is a diagram depicting the configuration of the switching regulator of the present invention. The switching regulator of the present invention is comprised of a hard switching regulator circuit 109a of which output power is variable, a plurality of soft switching regulator circuits 109b to 109z of which output power is a constant value α, an output decision circuit 106 for detecting an output voltage in an output terminal 107, and a control circuit 100. The control circuit 100 receives output voltage at the output terminal 107 from the output decision circuit 106 and controls the output power of the switching regulator 109 based on this.

Now control of the output will be described for understanding the switching regulator of the present invention.

Figure 3:
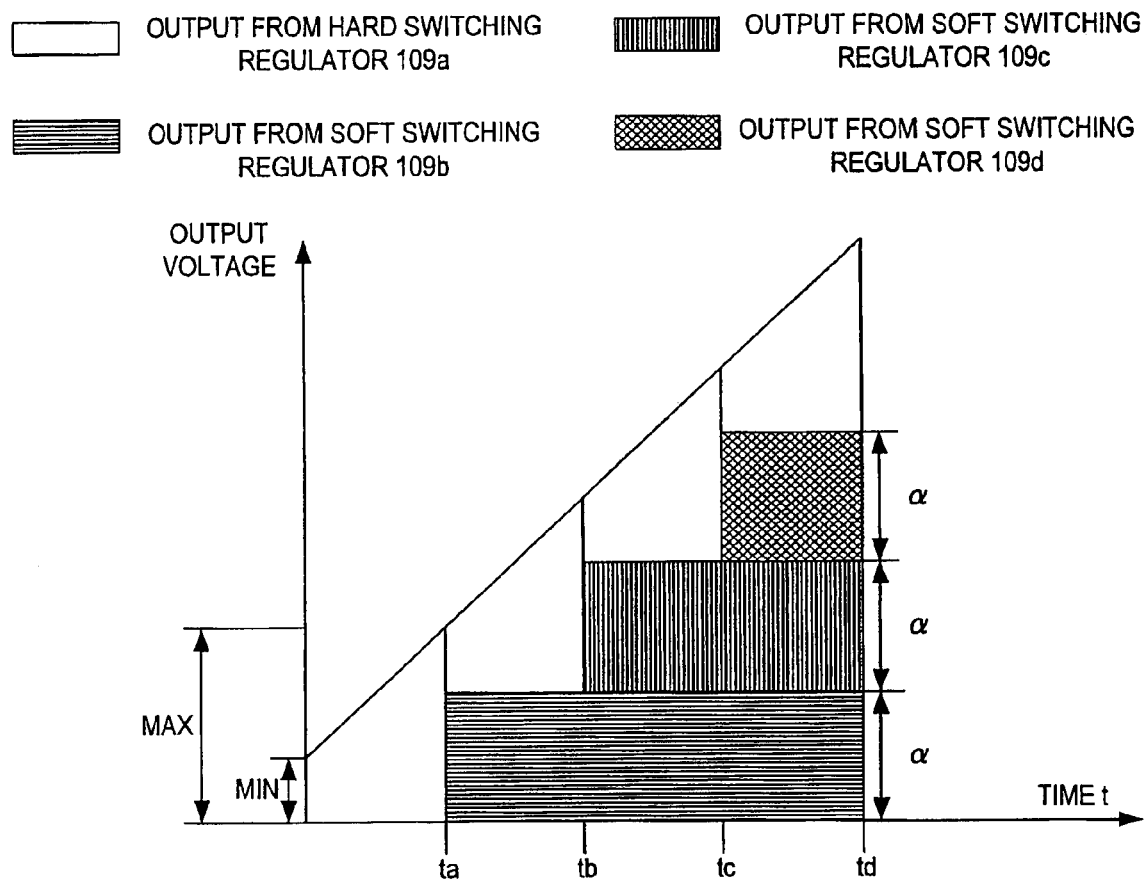
FIG. 3 is a diagram depicting output from the switching regulator of the present invention.

FIG. 3 is a diagram depicting the change of the output from the switching regulator of the present invention. First, in FIG. 3, the switching regulator of the present invention increases the output power at a predetermined ratio. The abscissa is the time, and the ordinate is the output voltage. The switching regulator of the present invention outputs the minimum output value MIN at time t=0. This output is an output from the hard switching regulator circuit 109a, and the outputs of the plurality of soft switching regulator circuits 109b to 109z are stopped. The hard switching regulator circuit 109a is adjusted by the driver 105A, which is driven according to the PWM pulse supplied from the control circuit 100, and outputs a power between the maximum value MAX and the minimum value MIN.

The output power from the hard switching regulator circuit 109a increases along with the time elapsed, and reaches the maximum value MAX. At time ta, when the output power reaches the maximum value MAX, the soft switching regulator circuit 109b is activated by the ON/OFF signal which is received from the control circuit 100, and starts outputting the predetermined output power α. At this time, the output power from the hard switching regulator circuit 109a changes to MAX-α.

When time further elapses, the output power from the hard switching regulator circuit 109a increases again as time elapses. And at time tb, the output power from the hard switching regulator circuit 109a reaches MAX again. At this time, the soft switching regulator circuit 109c receives an ON/OFF signal from the control circuit 100, and is activated, and starts outputting a predetermined output power α. At the same time, the output power from the hard switching regulator circuit 109a becomes MAX-α again. Hereafter the same processing is repeated at times tc and td.

By this processing, power to be supplied increases and the output voltage at the output terminal 107 reaches the target voltage. Now returning to FIG. 2, the operation of the switching regulator 109 will be described.

In the switching regulator 109 of the present invention, a coil L is connected to an input power supply Vin (e.g. 12V), and a transistor 102 exists between the coil L and ground. A transistor 103 is disposed between a connection point Vds of the coil L and the transistor 102 and the output terminal 107. A smoothing capacitor C is connected between the transistor 103 and the output terminal 107. Diodes are connected in parallel to the transistor 102 and 103.

The gate pulse signals glz and gh are supplied to the gates of the transistors 102 and 103 from the driver 105 and control circuit 100. The operation of the switching regulators 109a to 109z will be described based on the operation waveforms of the gate pulse signals gl and gh.

Figure 4:
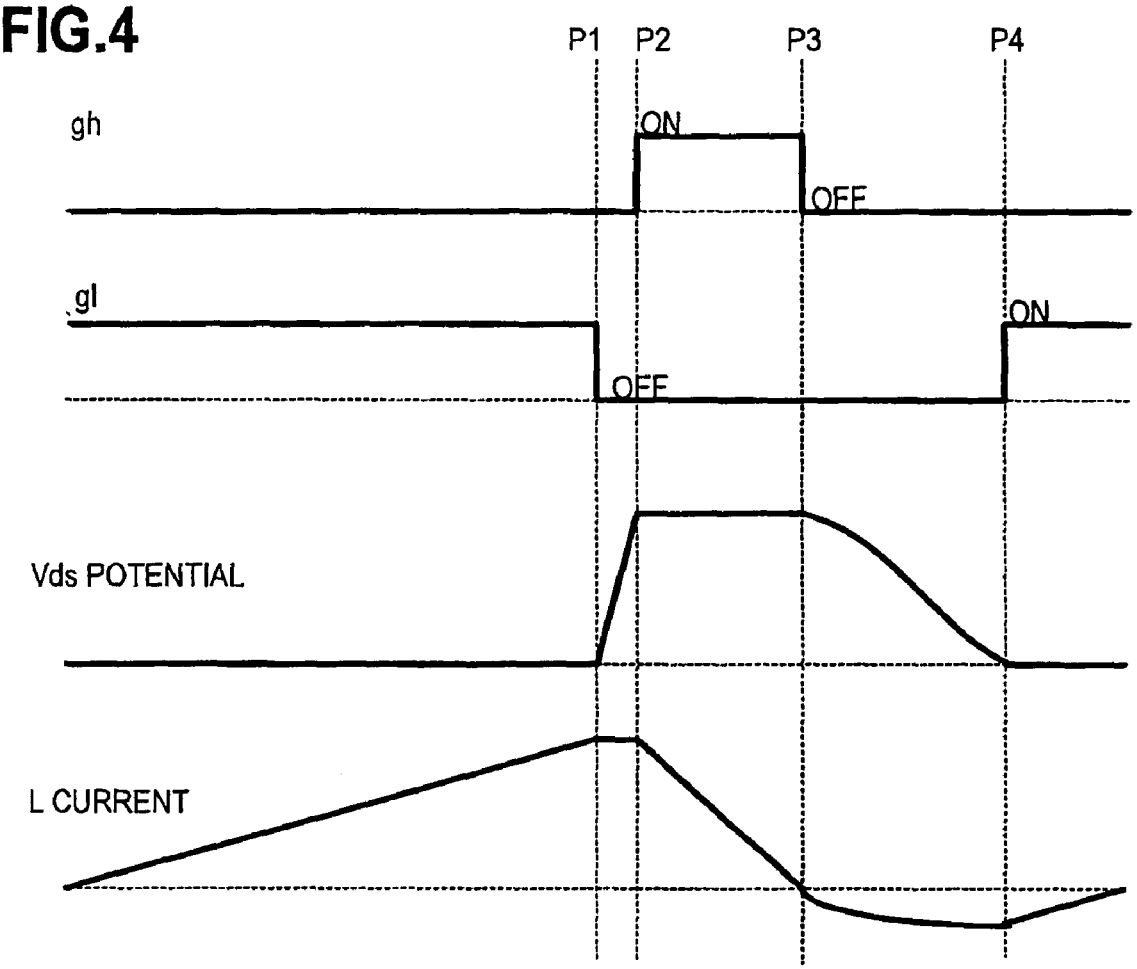
FIG. 4 is a diagram depicting the operation waveform of the switching regulator of the present invention.

FIG. 4 is a diagram depicting the operation waveform of the switching regulator of the present invention. FIG. 4 shows the operation waveforms of the gate pulse signals gh and gl, the potential of the connection point Vds, and the L current which flows through the coil L. FIG. 4 shows the operation waveform for one cycle, and this is repeated in actual operation.

First a gate pulse signal gl, to be input to the transistor 102, becomes high level at timing P4, and turns the transistor 102 ON, and the coil L is connected between the input power supply Vin and ground. As a result, current flows through the coil L and energy is stored in the coil. The control circuit 100 controls the timing P1 to turn the transistor 102 OFF, in order to control the ON time of the transistor 102. When the gate pulse signal gl becomes low level at timing P1 and the transistor 102 turns OFF, the potential of the connection point Vds rises according to the parasitic capacity of the connection point Vds.

At timing P2 when the potential of the connection point Vds becomes the same as the output voltage, a signal gh, to be input to the gate of the transistor 103, becomes high level and the transistor 103 turns ON. As a result, energy stored in the coil L is released to the output terminal 107. The current that flows through the coil L decreases forming a curve according to the inductance of the coil L. The control circuit 100 sets the signal gh to low level and turns the transistor 103 OFF at timing P3 when the current that flows through the coil L becomes 0.

After timing P3, the direction of the current that flows through the coil L reverses, and the potential of the connection point Vds starts dropping. In other words, the stored charges in the parasitic capacity of the connection point Vds are released, and the potential of the connection point Vds drops. The control circuit 100 sets the signal gl to high level and turns the transistor 102 ON at timing P4 when the potential of the connection point Vds becomes 0. As a result, the current that flows through the coil L inverts and increases.

In the hard switching regulator 109a, the output power thereof is variably controlled by variably controlling the duty ratio of the gate pulse signals gl and gh. The output power is variably controlled between the maximum supply power MAX and the minimum supply power MIN.

In the soft switching regulators 109b to 109z, on the other hand, the switching from L level to H level of the gate pulse signal gl is fixed at a timing when the voltage of the connection point Vds becomes 0, and the switching from H level to L level of the signal gh is fixed at a timing when the inductance current becomes 0. The ON/OFF signal controls only the voltage supply operation and the stopping operation.

The operation of the switching regulator 109 was described above, and now the operation of the entire circuit will be described according to FIG. 2.

The output voltage of the switching regulator of the present invention is input to the output decision circuit 106. The output voltage that is input to the output decision circuit 106 is supplied to differential amplifiers 101a, 101b and 101z via resistors R, Ra, Rb and Pz. The numbers of the differential amplifiers and the resistors to be provided are numbers according to the maximum value of the output voltage of the switching regulator. This is for maintaining a predetermined detection accuracy which is independent from the maximum value of the output voltage. The reference voltage generated by a reference voltage generation circuit 108 is also supplied to the differential amplifiers 101a, 101b and 101z. The differential amplifiers 101a to 101z compare the two inputs, and supply the output to the control circuit 100 according to the comparison result.

The output voltage that is supplied from the output decision circuit 106 is input to the control circuit 100. The control circuit 100 internally holds the target voltage. If the supplied voltage is lower than the target voltage, the pulse width to be supplied to the driver 105A is decreased, so that the pulse width in high level of the signal gl to be supplied to the transistor 102A is increased, the ON time of the transistor 102A is increased, and the output voltage to be supplied to the output terminal 107 is increased. The driver 105 is a circuit for turning the transistor 102 ON when the signal to be input is low level. If the determined output voltage is higher than the target voltage, on the other hand, the pulse width to be supplied to the driver 105A is increased so that the pulse width in high level of the signal gl to be supplied to the transistor 102A is decreased, the ON status time of the transistor 102A is decreased, and the output voltage to be supplied to the output terminal 107 is decreased.

Thus far control of the switching regulator was described, and now the operation of the control circuit 100 for controlling the output voltage to the target voltage will be described.

Figure 5:
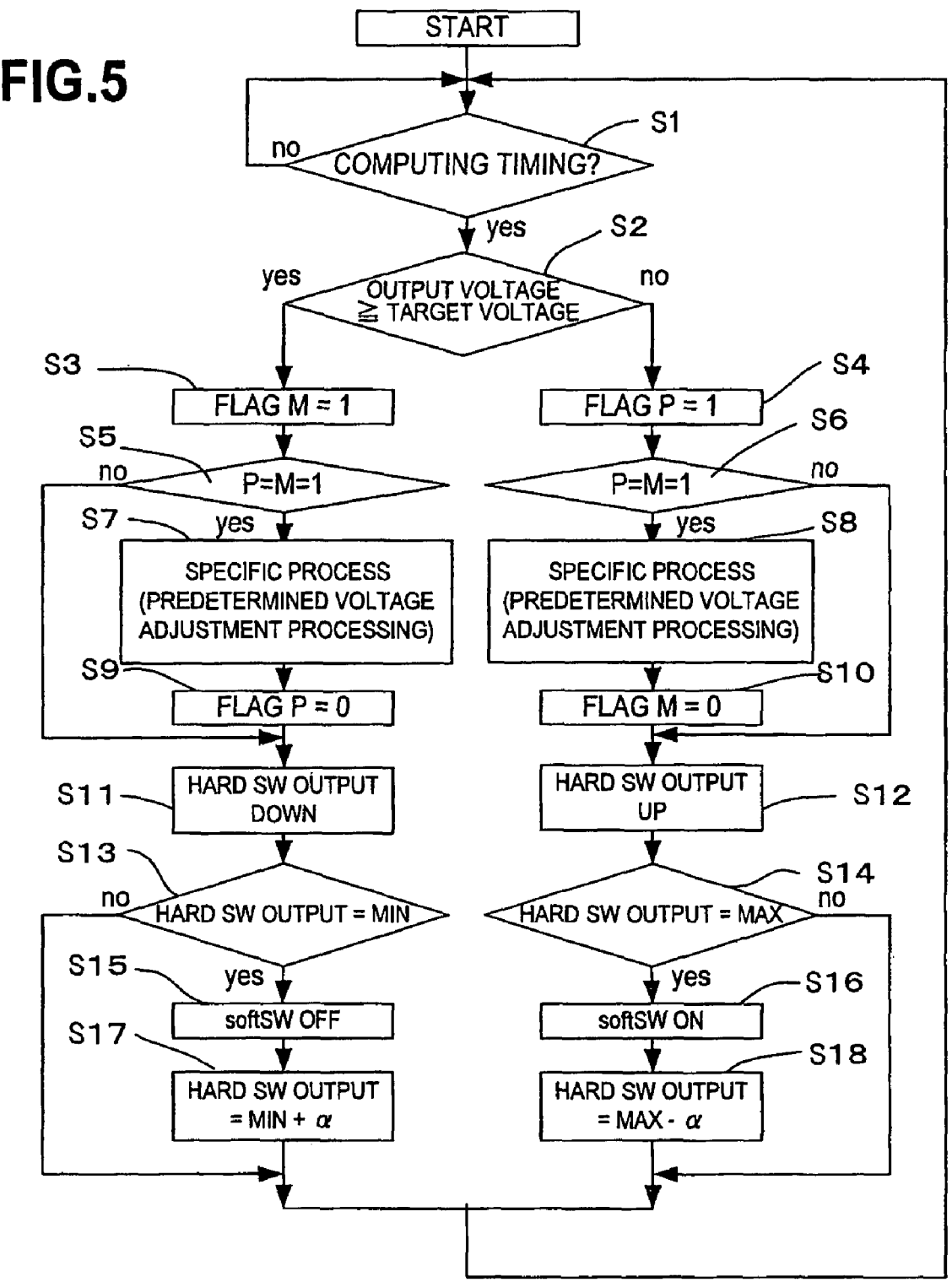
FIG. 5 is a flow chart depicting a voltage control method of the switching regulator of the present invention.

FIG. 5 is a flow chart depicting the voltage control method in the switching regulator of the present invention. In order to execute the flow chart in FIG. 5, the control circuit 100 develops a program in ROM (Read Only Memory) 130 mounted internally into RAM (Random Access Memory) 140. And a CPU (Central Processing Unit) 120 executes the program. The ROM 130 also holds the target voltage.

Figure 21:
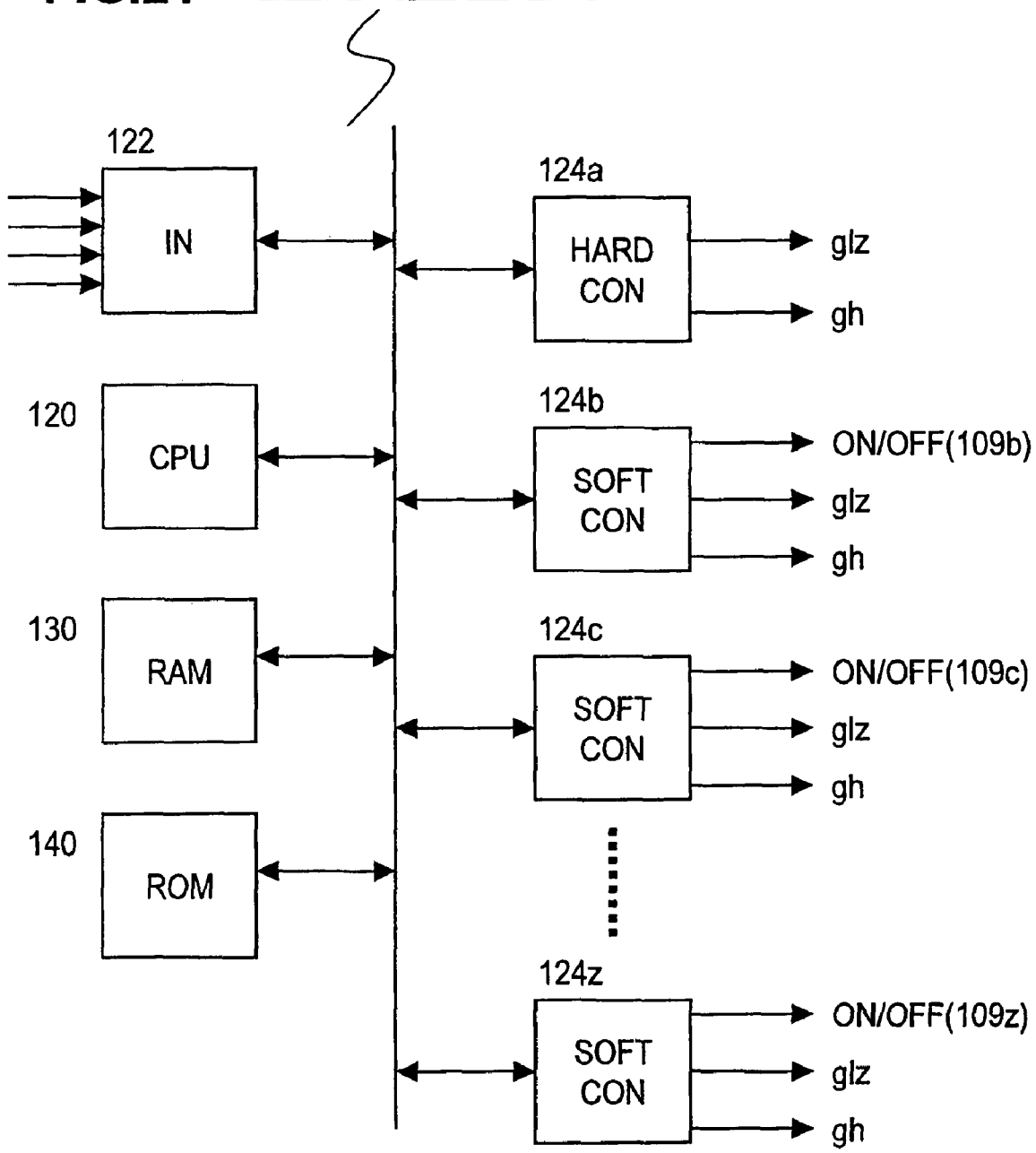
FIG. 21 is a diagram depicting a configuration example of the control circuit.

FIG. 21 is a diagram depicting a configuration example of the control circuit. An input circuit IN inputs the digital signal of the detected voltage from the output decision circuit 106, and the detected voltage data that is input is stored in a predetermined area of RAM 130. The CPU 120 executes the control program in ROM and controls the hard switching regulator 109a via the control circuit 124a, and controls the soft switching regulators 109b to 109z via the control circuits 124b to 124z respectively. The control circuit 124a controls the output power of the soft switching regulator 109a by controlling the duty ratio of the gate pulse signals glz and gh. The control circuits 124b to 124z, on the other hand, sets the duty ratio of the gate pulse signals glz and gh to be constant, and controls the operation start and the operation stop of the soft switching regulator 109a by the ON/OFF signal.

When the program of the present invention is executed, it is judged whether it is a computing timing for controlling to the output voltage (step S1). If it is a computing timing, the output voltage supplied from the output decision circuit 106 and the target voltage in ROM 130 are compared (step S2). If the output voltage to be supplied from the output decision circuit 106 is a target voltage or more, "1" is set in the flag M (step S3). If the output voltage is less than the target voltage, on the other hand, "1" is set in the flag P (step S4). Flags M and P are set for detecting the timing when the output voltage passes the target voltage.

Figure 6:
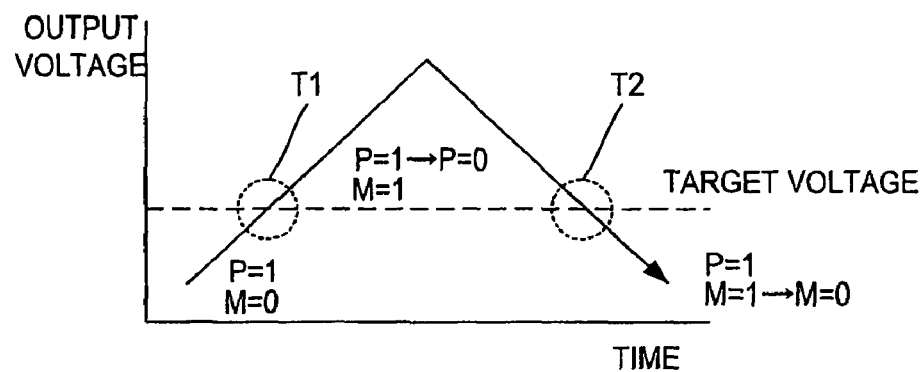
FIG. 6 is a diagram depicting a timing when the output voltage passes the target voltage.

FIG. 6 is a diagram depicting the timing when the output voltage passes the target voltage. The switching regulator of the present invention detects a timing when the output voltage in the status lower than the target voltage becomes higher than the target voltage, as shown in timing T1 in FIG. 6. As timing T2 in FIG. 6 shows, a timing when the output voltage in the status higher than the target voltage becomes lower than the target voltage is also detected. The target voltage is stored in the control circuit 100 in advance.

After "1" is set in the flag M in step S3, it is confirmed whether both flag M and flag P are "1" (step S5). If both flag M and flag P are "1", the timing T1 in FIG. 6 is confirmed and a specified processing is performed (step S7). The specified processing in step S7 will be described later. Then flag P is reset to "0" (step S9). If it is confirmed that flag P is "0" in step S5, the processing advances to step S11 without executing steps S7 and S9.

After "1" is set in flag P in step S4, it is confirmed whether both of flag M and flag P are "1" (step S6). If both of flag M and flag P are "1", timing T2 in FIG. 6 is confirmed and a specified processing is performed (step S8). The specified processing in step S8 will be described later. Then flag M is reset to "0" (step S10). If it is confirmed that flag M is "0" in step S6, the processing advances to step S12 without executing steps S8 and S10.

After it is confirmed that at least one of flag M and flag P is "0" in step S5, or after flag P is reset in step S9, processing to decrease the output power from the hard switching regulator circuit 109a is performed (step S31). And it is confirmed whether the output power from the hard switching regulator circuit 109a is the minimum value MIN (step S13). If the output power from the hard switching regulator circuit 109a is the minimum value MIN, one of the soft switching regulator circuits of which output power is in ON status is switched to OFF status (step S15). And the output power from the hard switching regulator circuit 109a is set to a value resulting when the output power value α from the soft switching regulator circuit is added to the minimum value MIN (step S17). And the processing returns to step S1.

Figure 7:
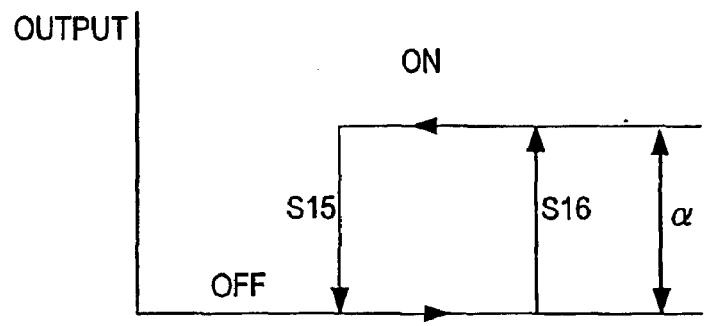
FIG. 7 is a diagram depicting the output status of a soft switching regulator circuit.
Figure 8:
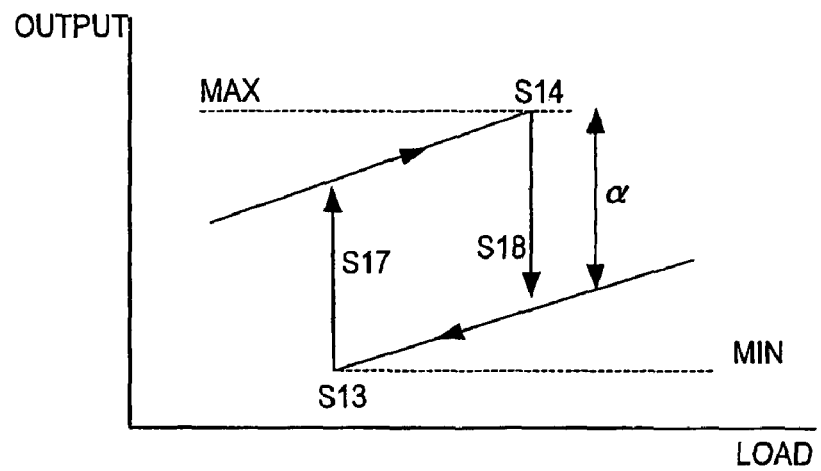
FIG. 8 is a diagram depicting the output status of a hard switching regulator circuit which is controlled according to the status of the soft switching regulator circuit.

FIG. 7 is a diagram depicting the output status of the soft switching regulator circuit. FIG. 8 is a diagram depicting the output status of the hard switching regulator circuit 109a controlled corresponding to the status of the soft switching regulator circuit. As FIG. 7 shows, the soft switching regulator circuit has only ON status and OFF status. In the case of OFF status, the output power is "0", and in the case of ON status, the output power is a predetermined value α. The fluctuation width (MAX-MIN) of the output power of the hard switching regulator circuit is greater than the predetermined value α.

FIG. 8 shows that the output power of the hard switching regulator circuit changes corresponding to the ON/OFF status of the soft switching regulator circuit. As the load of the external circuit, which is the connection destination of the output terminal 107, decreases and the output voltage increases, the output power of the hard switching regulator circuit 109*a* is decreased. And when the output power of the hard switching regulator circuit 109*a* reaches the minimum value MIN, one of the soft switching regulator circuits in ON status is switched to OFF status. Along with this, the output power of the hard switching regulator circuit 109*a* is increased by the output power value α of the soft switching regulator circuit in ON status. These controls are performed in steps S13, S15 and S17 in FIG. 5. By this, the hard switching regulator circuit 109*a* can drop the output power thereof.

Now FIG. 5 is referred to again.

After it is confirmed that at least one of flag M and flag P is "0" in step S6, or after flag M is reset in step S10, processing to increase the output power from the hard switching regulator circuit 109*a* is performed (step S12). And it is confirmed whether the output power from the hard switching regulator circuit 109*a* is the maximum value MAX or not (step S14). If the output power from the hard switching regulator circuit 109*a* is the maximum value MAX, one of the soft switching regulator circuits of which output power is in OFF status is switched to ON status (step S16). Then the output power from the hard switching regulator circuit 109*a* is set to a value resulting when the output power value α from the one soft switching regulator circuit is subtracted from the maximum value MAX (step S18). And the processing returns to step S1.

FIG. 8 shows that the output power of the hard switching regulator circuit 109*a* changes according to the ON/OFF status of the soft switching regulator circuit, as described above. As the load of the external circuit, which is a connection destination of the output terminal 107, increases and the output voltage decreases, the output power of the hard switching regulator circuit 109*a* is increased. And when the output power of the hard switching regulator circuit 109*a* reaches the maximum value MAX, one of the soft switching regulator circuits in OFF status is switched to ON status. According to this change, the output power of the hard switching regulator circuit 109*a* is decreased by the output power value α of the soft switching regulator circuit in ON status. These controls are performed in steps S14, S16 and S18 in FIG. 5.

Now the specified processings S7 and S8 in FIG. 5 will be described. The specified processing performed in step S7 or S8 in FIG. 5 has various forms. FIG. 9, FIG. 10 and FIG. 11 show examples of the specified processing performed in step S7. In these diagrams, the abscissa indicates the elapse of time, and the ordinate indicates the control target of the output voltage of the hard switching regulator circuit 109*a*. The control target is shown here because the control target power by the control circuit 100 and the actual output power may be different in some cases.

The specified processing in step S7, where it is already confirmed that the output voltage is the target voltage or higher, is shown in FIG. 9, for example. According to the control in FIG. 9, the control circuit 100 decreases the output power from the hard switching regulator circuit 109*a* by a predetermined value β1 when the processing shifted to step S7. The decrease of the predetermined value β1 is for adjusting the voltage for the amount of increase during the time from the point of actually reaching the target voltage to the time when this is detected and output power is controlled. Therefore the predetermined value β1 is greater than the power decrease amount α in step S11.

The control in FIG. 10 can be used instead of the control in FIG. 9. According to the control in FIG. 10, the control circuit 100 decreases the output power from the hard switching regulator circuit 109*a* by a predetermined value β2 when the processing shifted to step S7. The decrease of the predetermined value β2 is for adjusting the voltage for the amount of increase during the time from the point of actually reaching the target voltage to the time when this is detected and output power is controlled. Therefore the predetermined value β2 is greater than the power decrease amount α in step S11. After standing by until a predetermined time elapses, the output power of the hard switching regulator circuit 109*a* is adjusted again by the control in step S11. Here the reason why the output power is maintained to be constant during a predetermined time is to wait for the actual output power of the hard switching regulator circuit 109*a* to reach the control target.

Instead of the control in FIG. 9 and FIG. 10, the control in FIG. 11 can also be used. According to the control in FIG. 11, the output power from the hard switching regulator circuit 109*a* is decreased by a predetermined value β3 when the processing shifted to step S7. After waiting for the output voltage to be stabilized for a predetermined time, the output power is increased by a predetermined value β4. This control is performed because the predetermined value β3, which is initially decreased, is set to be higher than an actual value to be decreased, and the output power decreases too much by maintaining the output to be constant for the predetermined time, so the power which decreased too much is adjusted. The predetermined value β3 is also greater than the power decrease amount α in step S11.

Even if the output voltage does not reach the target voltage, the specified processing is performed in step S8.

FIG. 12, FIG. 13, FIG. 14 and FIG. 15 are examples of the specified processing to be performed in step S8. In these diagrams as well, the abscissa indicates the elapsed time, and the ordinate indicates the control target of the output voltage of the hard switching regulator circuit 109*a*.

The specified processing in step S8, where it is already confirmed that the output voltage is less than the target voltage, is shown in FIG. 12, for example. According to the control in FIG. 12, the output power from the hard switching regulator circuit 109*a* is increased by a predetermined value γ1 when the processing shifted to step S8. The increase of the predetermined value γ1 is for adjusting the voltage for the amount of decrease during the time from the point of actually reaching the target value to the time when this is detected and output power is controlled. Therefore the predetermined value γ1 is greater than the power increase amount α in step S12.

Figure 22:
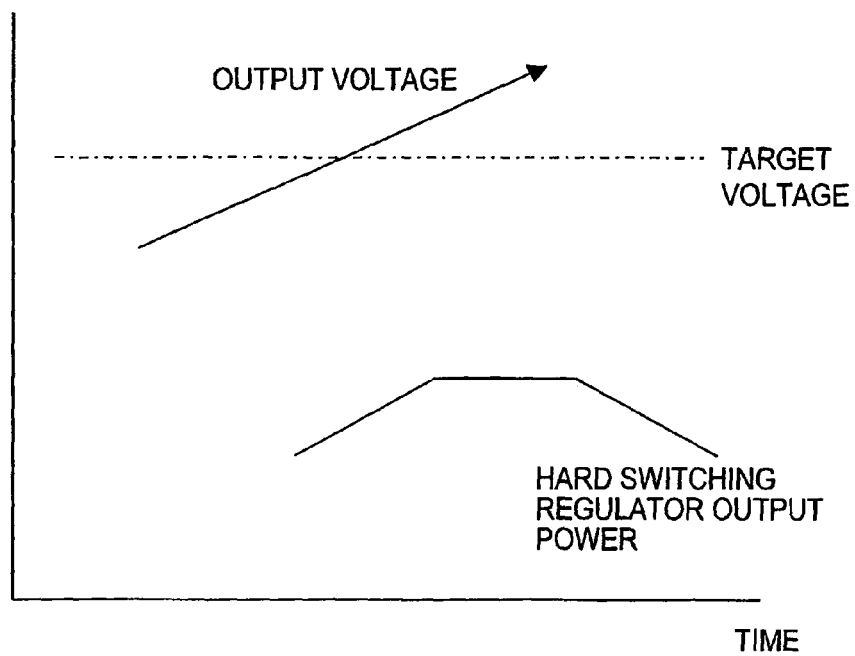
FIG. 22 is a diagram depicting a predetermined processing executed in step S7.

The control in FIG. 13 can be used instead of the control in FIG. 12. According to the control in FIG. 13, the output power from the hard switching regulator circuit 109*a* is maintained constant for a predetermined time when the processing shifted to step S8. This is a control for stabilizing the output voltage at an output voltage close to the target voltage. This processing could be performed in step S7. This is as shown in FIG. 22.

Instead of the control in FIG. 12 and FIG. 13, the control in FIG. 14 can also be used. According to the control in FIG. 14, the output power from the hard switching regulator circuit 109*a* is increased by a predetermined value γ2 when the processing is shifted to step S8. The decrease of the predetermined value γ2 is for adjusting the voltage decreased in time from the point of actually reaching the target voltage to the point of detecting and controlling it. The control circuit 100 maintains the output voltage constant until a predetermined time elapses, and waits for the output voltage of the hard switching regulator circuit 109*a* to be stabilized at an output target. Therefore the predetermined value γ2 is greater than the power of the increase amount α in step S12.

Figure 15:
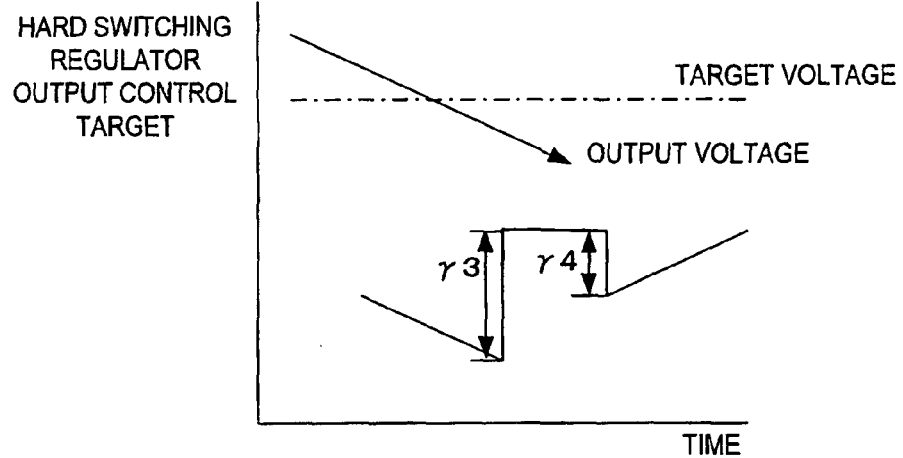
FIG. 15 is a diagram depicting an example of a specified processing performed in step S8.

Instead of the control in FIG. 12, FIG. 13 and FIG. 14, the control in FIG. 15 can also be used. According to the control in FIG. 15, the output power from the hard switching regulator circuit 109*a* is increased by a predetermined value γ3 when the processing shifted to step S8. The control circuit 100 waits for the output voltage to be stabilized during a predetermined time, then decreases the output power by a predetermined value γ4. This is because the predetermined value γ3, which is initially increased, is set to be higher than the actual value to be increased, and the output power increases too much by maintaining the output constant for the predetermined time, so the power increased too much is adjusted. The predetermined value γ3 is greater than the power increase amount α in step S12.

When the soft switching regulator circuit is controlled to be ON status in step S16 in FIG. 5, the half ON status may be created first, and is then shifted to ON status.

Figure 16:
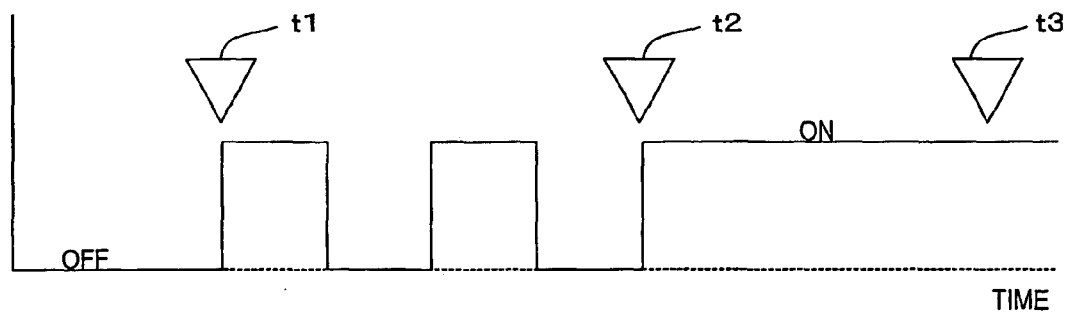
FIG. 16 is a diagram depicting a half ON status of the soft switching regulator circuit.

FIG. 16 is a diagram depicting the half ON status of the soft switching regulator circuit. Timings t1, t2 and t3 in FIG. 16 are the computing timings confirmed in step S1 in FIG. 5. The control circuit 100 detects the output voltage at these timings, so the soft switching regulator circuit should be controlled only at these timings. Therefore these timings are further divided, and a half ON status, where ON status and OFF status are repeated when OFF status is shifted to ON status, is generated. By a status transition via this half ON status, the fluctuation of the output voltage becomes smoother and output voltage is stabilized.

In half ON status, the output power from the hard switching regulator circuit 109a may be decreased by a predetermined value if the soft switching regulator circuit is in ON status, while the output power from the hard switching regulator circuit 109a may be increased by a predetermined value if the soft switching regulator circuit is in OFF status. By this control, the fluctuation of the output power becomes smoother and the output voltage can be further stabilized.

In this way, the voltage control method in the switching regulator of the present invention can detect a timing when the output voltage passes the target voltage, and can perform control according to the fluctuation tendency of the output voltage so as to stabilize the output voltage at the target voltage.

Figure 17:
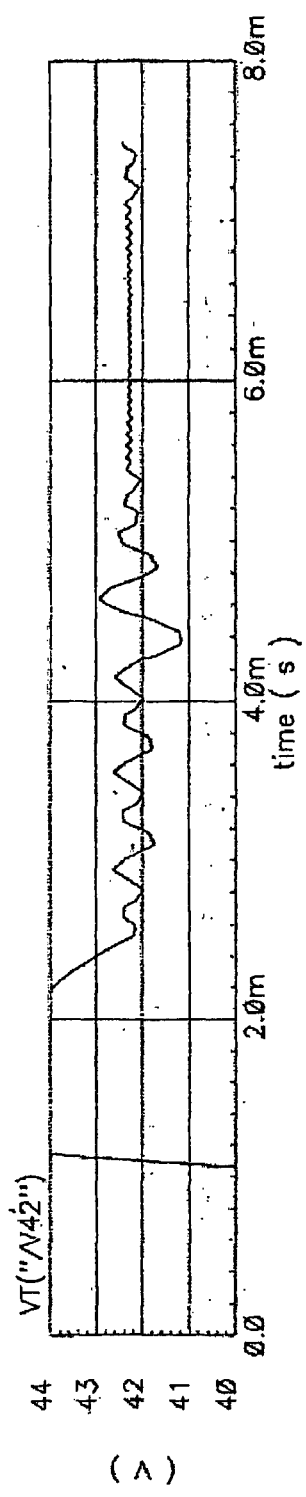
FIG. 17 is a graph depicting the output voltage when prior art is used.
Figure 18:
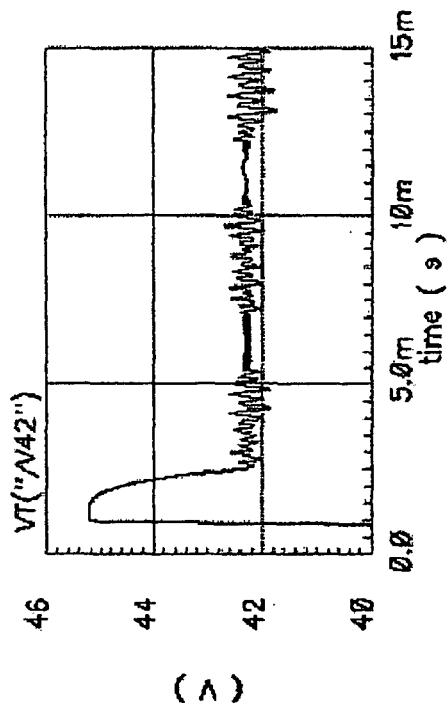
FIG. 18 is a graph depicting the output voltage when the present invention is used.

FIG. 17 is a graph depicting the output voltage when a prior art is used. FIG. 18 is a graph depicting the output voltage when the present invention is used. In FIG. 17, a timing when the output voltage passes the target voltage is not detected, and the specified processings in step S7 and S8 in FIG. 5 are not performed. Half ON status in the status transition of the soft switching regulator circuit is not generated either. In the case of the voltage change at 2.5 milliseconds or later after power is turned ON in the device, the output voltage changes with about a 1.8V width if a prior art is used, whereas the output voltage changes with about a 0.9V width if the present invention is used. In this way, if the present invention is used, the output voltage can be stabilized more so than a prior art.

Figure 19:
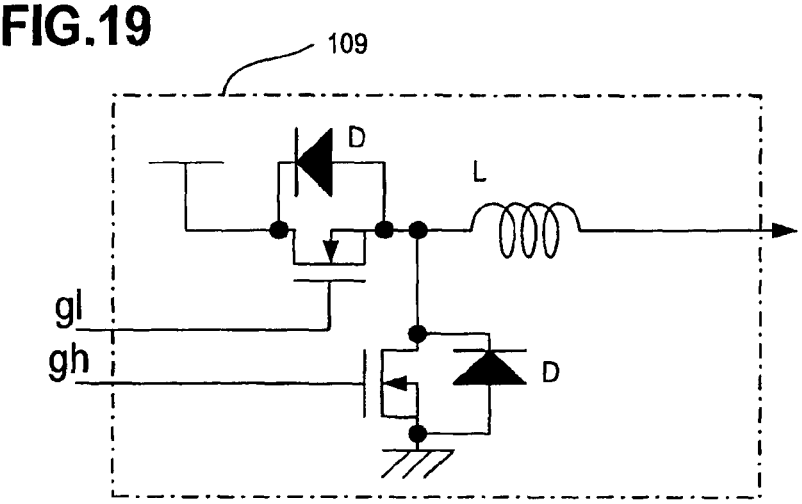
FIG. 19 is a diagram depicting an example of the case of constructing a switching channel by a step-down method.
Figure 20:
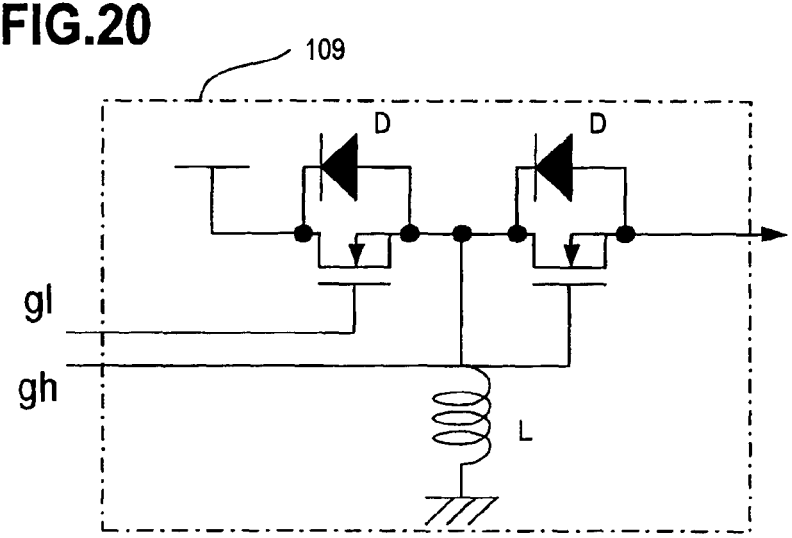
FIG. 20 is a diagram depicting an example of the case of constructing a switching channel by an inversion method.

The switching regulator 109 driven by the drivers 105A to 105Z in FIG. 2 is implemented by a step-up method, but the switching regulator 109 can also be implemented by a step-down method, shown in FIG. 19, or an inversion method, shown in FIG. 20.

Further, the number of soft switching regulator circuit 109b-109z may be one according to the present invention. In this case, the controllable range of output voltage may be narrower.

What is claimed is:

1. A switching regulator constituted by a plurality of switching regulator circuits for inputting a predetermined common power supply voltage, and supplying an output voltage to a common external circuit, so as to adjust the output voltage that is applied to the external circuit to be a target voltage, comprising:

a first switching regulator circuit which outputs a variable power according to a pulse width modulation pulse to be supplied;

a second switching regulator circuit which outputs or stops a constant power according to a control signal to be supplied;

an output decision circuit which detects the output voltage to be applied to the external circuit; and a control circuit which adjusts the pulse width modulation pulse to be supplied to the first switching regulator circuit and the control signal to be supplied to the second switching regulator circuit according to a detected voltage supplied from the output decision circuit, so as to control the output voltage to be supplied to the external circuit, wherein the control circuit compares the detected voltage and the target voltage, decreases the variable power of the first switching regulator circuit by a predetermined amount if the detected voltage is higher than the target voltage, increases the variable power of the first switching regulator circuit by the predetermined amount if the detected voltage is lower than the target voltage, increases the variable power of the first switching regulator circuit by an amount greater than the predetermined amount if the detected voltage changes from a status higher than the target voltage to a status lower than the target voltage, and decreases the variable power of the first switching regulator circuit by an amount greater than the predetermined amount if the detected voltage changes from a status lower than the target voltage to a status higher than the target voltage.

2. The switching regulator according to claim 1, wherein
if the variable power of the first switching regulator circuit reaches a lower limit value, the control circuit stops the second switching regulator circuit outputting the constant power, adjusts the pulse width modulation pulse, to increase the variable power by the constant power, and
if the variable power of the first switching regulator circuit reaches an upper limit value, the control circuit controls the second switching regulator circuit in stopped status to be the status of outputting the constant power, and decreases the variable power of the first switching regulator circuit by the constant power.

3. The switching regulator according to claim 1, wherein
when the stopped status of the second switching regulator circuit is switched to the status of outputting the constant power, the control circuit performs control so as to alternately repeat the status of outputting the constant power and the stopped status at a cycle faster than a cycle of comparing the output voltage and the target voltage.

4. The switching regulator according to claim 3, wherein in the status when the second switching regulator circuit repeats the status of outputting the constant power and the stopped status, the control circuit decreases the variable power of the first switching regulator circuit by a predetermined amount when the second switching regulator circuit is in the status of outputting the constant power, and increases the variable power of the first switching regulator circuit by a predetermined amount when the second switching regulator circuit is in stopped status.

5. The switching regulator according to claim 1, wherein
if the detected voltage changes from a status higher than the target voltage to a status lower than the target voltage, the variable power of the first switching regulator circuit is increased by an amount greater than the predetermined amount, and then the variable power is maintained at a constant level during a predetermined time, and if the detected voltage changes from a status lower than the target voltage to a status higher than the target voltage, the variable power of the first switching regulator circuit is decreased by an amount greater than the predetermined amount, and then the variable power is maintained at a constant level during a predetermined time.

6. A switching regulator constituted by a plurality of switching regulator circuits for inputting a predetermined common power supply voltage, and supplying an output voltage to a common external circuit, so as to adjust the output voltage that is applied to the external circuit to be a target voltage, comprising:

a first switching regulator circuit which output a variable power according to a pulse width modulation pulse to be supplied;

a second switching regulator circuit which output or stop a constant power according to a control signal to be supplied;

an output decision circuit which detects the output voltage to be applied to the external circuit; and a control circuit which adjust the pulse width modulation pulse to be supplied to the first switching regulator circuit and the control signal to be supplied to the second switching regulator circuit according to a detected voltage supplied from the output decision circuit, so as to control the output voltage to be supplied to the external circuit, wherein the control circuit compares the detected voltage and the target voltage, decreases the variable power of the first switching regulator circuit by a predetermined amount if the detected voltage is higher than the target voltage, increases the variable power of the first switching regulator circuit by the predetermined amount if the detected voltage is lower than the target voltage, the variable power is maintained at a constant level during a predetermined time if the detected voltage changes from a status higher than the target voltage to a status lower than the target voltage, and the variable power is maintained at a constant level during a predetermined time if the detected voltage changes from a status lower than the target voltage to a status higher than the target voltage.

* * * * *